Aug. 21, 1928.
F. J. RUSSELL
1,681,435
MOTOR CONTROLLER
Filed June 1, 1926
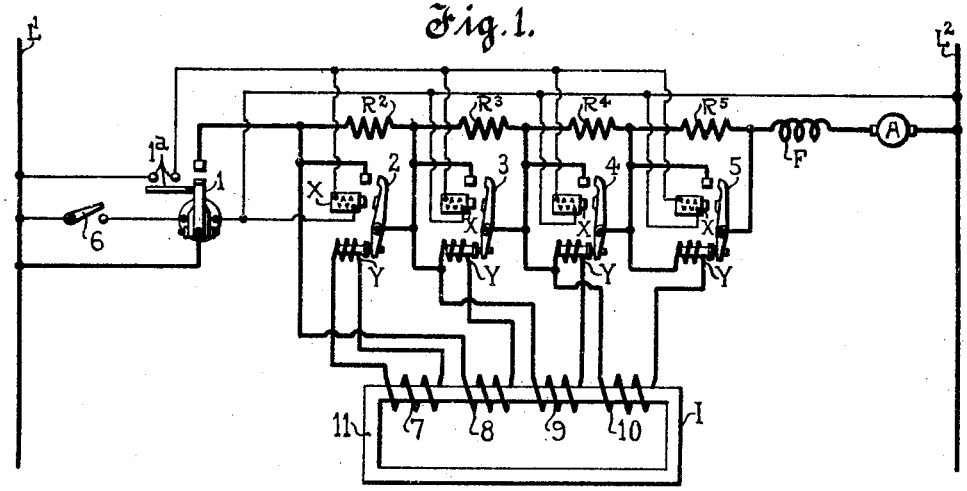
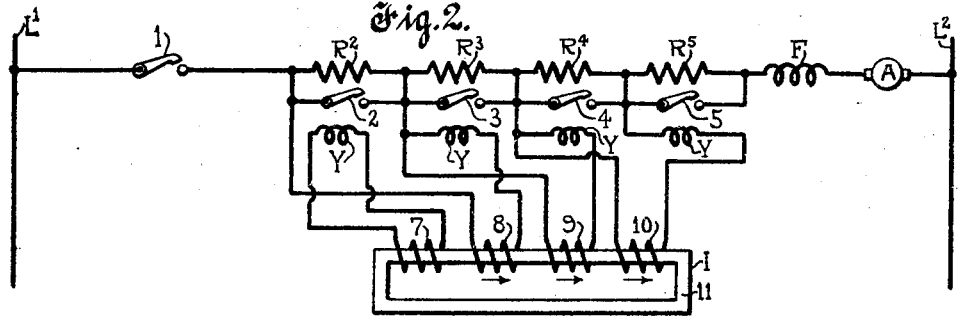
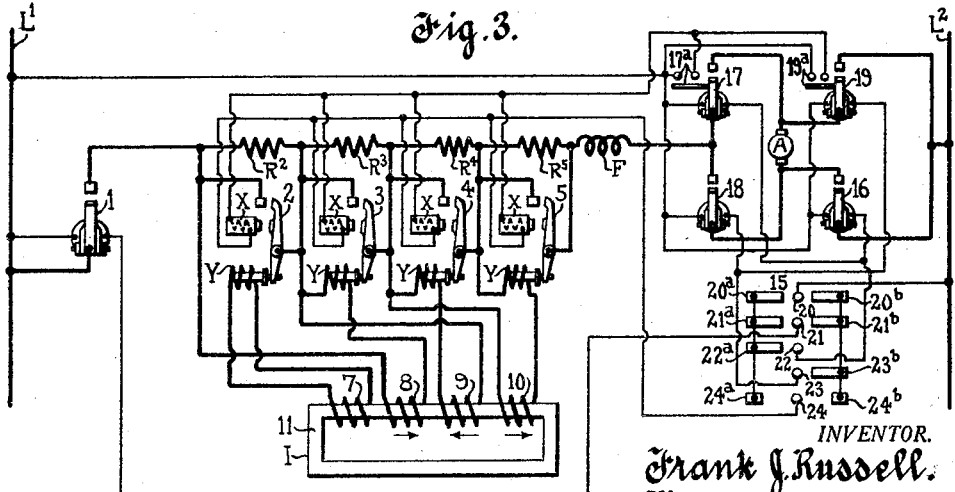
INVENTOR.
Frank J. Russell.
BY Frank A. Hubbard
ATTORNEY.

Patented Aug. 21, 1928.

1,681,435

UNITED STATES PATENT OFFICE.

FRANK J. RUSSELL, OF WAUWATOSA, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed June 1, 1926. Serial No. 112,845.

This invention relates to controllers for electric motors, although certain features thereof may be advantageously employed in other relations.

The invention is particularly applicable to controllers for direct current motors wherein inductive means is employed to effect arrest of the operation of the controller in different stages thereof.

The patent to Clarence T. Evans, No. 1,479,033, of January 1, 1924, discloses a controller of this character including accelerating switches having restraining windings and one or more inductors for supplying transient currents to the restraining windings of said switches to delay operation thereof. The inductor windings are connected in series with the motor and due to this fact it is necessary to vary the current carrying capacity of such windings to suit the size of the controlled motor.

The present invention has among its objects to provide a controller of the aforesaid character employing a standard inductor for all sizes of motors of the same voltage.

Another object is to minimize the amount of active iron and copper required in the inductor for a given timing of the controller.

Another object is to provide a controller of the aforesaid character wherein an inductor of standard overall dimensions may be employed for all sizes of motors regardless of the voltage thereof.

Another object is to provide a controller of the aforesaid character employing a standard inductor capable of being connected in various ways in the motor circuit to provide for variation in the delay of closure of the accelerating switches.

Another object is to provide a reversing controller of the aforesaid character which provides a longer delay in closure of the first accelerating switch upon plugging of the motor than upon starting of the motor from rest.

Various other objects and advantages of the invention will hereinafter appear.

The accompanying drawing diagrammatically illustrates certain embodiments of the invention which will now be described, it being understood that the embodiments illustrated may be modified in certain respects without departing from the spirit and scope of the appended claims.

In the drawing:

Figure 1 diagrammatically illustrates one form of controller embodying the invention;

Fig. 2 is a so-called across-the-line diagram of certain of the circuit connections illustrated in Fig. 1; and Fig. 3 diagrammatically illustrates a reversing controller embodying a modification of the controller shown in Fig. 1.

Referring to Fig. 1, the controller is employed in connection with a direct current motor having an armature A and a series field winding F, it being understood that the motor may be of any other preferred type. The controller includes an electro-responsive main switch 1 for connecting the motor across lines $L^1$—$L^2$, and electro-responsive accelerating switches 2, 3, 4 and 5 for controlling starting resistances $R^2$, $R^3$, $R^4$ and $R^5$, respectively, in the motor circuit. Each of the accelerating switches is of the two magnet type, the same being provided with a shunt operating winding X and a restraining winding Y. A manually operated switch 6 is provided for connecting the operating winding of main switch 1 across lines $L^1$—$L^2$, and upon response of said main switch, auxiliary contacts $1^a$ associated therewith connect the shunt operating windings X of the several accelerating switches in parallel across said lines. Accordingly, all of the accelerating switches tend to respond upon completion of their energizing circuits, but each of said switches has its restraining winding normally energized to prevent response thereof.

More specifically, the restraining windings Y of the resistance control switches 2, 3, 4 and 5 are associated with coils 7, 8, 9 and 10, respectively, of an inductor I, all of said coils being mounted upon a core member 11. As best shown in Fig. 2, the restraining winding Y of switch 2 is permanently connected across the terminals of coil 7, and also, as shown in this figure, inductor coils 8, 9 and 10 are each connected in series with their associated restraining windings Y and in shunt across the resistances $R^2$, $R^3$ and $R^4$, respectively.

Thus, upon closure of switch 1 the motor is connected across lines $L^1$ and $L^2$ through resistance sections $R^2$, $R^3$, $R^4$ and $R^5$, and the inductor coils 8, 9 and 10 are energized by currents which are a function of the voltage drop across resistance sections $R^2$, $R^3$ and $R^4$, respectively. As indicated by arrows in Fig. 2, coils 8, 9 and 10 are arranged so that their magnetomotive forces are additive in the core 11 and said currents therefore act cumulatively to induce a transient current in coil 7. The induced current in coil 7 passes through the restraining winding Y of accelerating switch 2 to hold said switch in open position and after a temporary period the induced current in said coil drops to a given value to permit closure of said switch for exclusion of resistance section $R^2$. Immediately upon exclusion of resistance section $R^2$ the restraining winding Y of switch 3 is short-circuited with coil 8, and said coil then acts by self-induction to maintain said restraining winding energized for a temporary period to delay closure of said switch. However, it should be noted that such period is influenced by the stored energy in the electromagnetic circuit of inductor I at the time of closure of switch 2 and is also influenced to some extent by the inductive effect of coils 9 and 10 on coil 8 which results from the changing current in the motor circuit. Upon exclusion of resistance section $R^3$ restraining winding Y of switch 4 is short-circuited with inductor coil 9 whereby said inductor coil acts by self induction to supply a transient current to said restraining winding to delay closure of switch 4. Such delay is influenced by the stored energy in the electromagnetic circuit of inductor I at the time of closure of switch 7 and is also influenced to some extent by the inductive effect of coil 10 on coil 9 which results from the changing current in the motor circuit. Closure of switch 4 connects the restraining winding Y of switch 5 across the terminals of coil 10. Coil 10 then acts by self induction to supply a transient current to the restraining winding Y of switch 9 to delay closure of said switch for a period determined by the stored energy in the electromagnetic circuit of inductor I at the time of closure of switch 4.

The aforedescribed controller thus provides time limit control which is influenced to some extent by surges in the motor current resulting from exclusion of the accelerating resistances. However, the extent to which the controller is influenced by surges in the motor current is dependent upon the design of inductor I. For example, if the inductor is designed so that the core thereof becomes substantially saturated under light starting currents, heavy surges in the motor current will produce substantially no variation in the timing of the controller. On the other hand, if the core of the inductor is designed so as to remain unsaturated under heavy starting currents, the timing of the controller will be influenced to a large extent by variations in the starting current, and, where provision is made for plugging the motor, a longer delay can be obtained in closure of the first accelerating switch upon plugging than upon starting from rest. However, a standard inductor having interchangeable windings may be employed for all sizes of motors of the same voltage, and for motors of different voltages the number of turns on the coils of the inductor may be varied to obtain the desired timing without varying the overall dimensions of the inductor.

Referring now to Fig. 3, the same illustrates a modification of the controller shown in Fig. 1 wherein the connections for inductor coil 9 are reversed so that the magnetomotive force of such coil acts in opposition to the magnetomotive force of coils 8 and 10. When the motor is connected across lines $L^1$ and $L^2$ through resistance sections $R^2$ to $R^5$, inclusive, the inductor coils 8, 9 and 10 are energized by currents which are a function of the voltage drop across resistance sections $R^2$, $R^3$ and $R^4$, respectively. However, with the connections of coil 9 reversed the induced current in coil 7 is a function of the difference between the magnetomotive force of coil 9 and coils 8 and 10. The induced current in coil 7 passes through the restraining winding Y of switch 2 to hold said switch in open position, and after a temporary period the induced current in said coil drops to a given value to permit closure of said switch for exclusion of resistance $R^2$. Upon closure of accelerating switch 2 inductor coil 8 is short-circuited through its associated restraining winding Y to delay closure of switch 3. However, it should be noted that if resistance $R^4$ is larger than resistance $R^5$, as is the usual practice, the voltage across inductor coil 9 is higher than the voltage across inductor coil 10 whereby coil 9 serves to reverse the flux in the core member 11 upon closure of switch 2. Upon closure of switch 3, winding 9 is short-circuited through its associated restraining winding Y to delay closure of switch 4, and the magnetomotive force of coil 10 then acts to again reverse the flux in the core 11 of inductor I. Upon closure of switch 4 winding 10 is short-circuited through its associated restraining winding to delay closure of switch 5.

In connection with Fig. 3, it should be noted that the aforedescribed reversal of the flux in core 11 tends to increase the time element incident to response of switches 2, 3 and 4. In other words, it is possible with an inductor of a given size to obtain a longer delay in closure of the accelerating switches with the controller shown in Fig. 3 than is obtained with the controller shown in Fig. 1.

If desired, the controller may be provided with a master switch 15 for controlling the main switch 1 and also for controlling two sets of reversing switches 16—17 and 18—19. The master switch 15 as shown comprises contacts 20 to 24, inclusive, and two sets of cooperating movable contacts, one set including contacts 20$^a$, 21$^a$, 22$^a$ and 24$^a$, and the other set including contacts 20$^b$, 21$^b$, 23$^b$ and 24$^b$. Also, the reversing switches 17 and 19 are provided with normally open auxiliary contacts 17$^a$ and 19$^a$ for controlling the energizing circuit of the shunt operating windings X of accelerating switches 2 to 5, inclusive.

Upon movement of the master switch 15 towards the right switch 1 is energized through the medium of contacts 20, 20$^a$, 21$^a$ and 21, while reversing switches 16 and 17 are energized through the medium of contacts 20, 20$^a$, 22$^a$ and 22. Also, upon closure of reversing switch 17 all of the restraining windings X of switches 2 to 5, inclusive, are energized through the medium of contacts 20, 20$^a$, 24$^a$ and 24 and the auxiliary contacts 17$^a$ associated with switch 17. With the master switch 15 in its left hand position, main switch 1 is energized through the medium of contacts 20, 20$^b$, 21$^b$ and 21, while reversing switches 18 and 19 are energized through the medium of contacts 20, 20$^b$, 23$^b$ and 23. Also, upon closure of reversing switch 19 the restraining windings X of switches 2 to 5, inclusive, are energized through the medium of contacts 20, 20$^b$, 24$^b$, 24 and the auxiliary contacts 19$^a$ associated with reversing switch 19.

Although two specific embodiments of the invention have been disclosed, it should be understood that the invention is not limited to such embodiments. The number of accelerating steps can be increased or decreased if desired, and transient effects of different magnitude and duration may be obtained by working the inductor on various portions of the saturation curve thereof. For example, such variations in the transient effects may be produced by arranging the inductor coils so that the magnetomotive forces thereof are in relatively different directions than those shown in the drawing, and such variations may also be obtained by connecting the coils in shunt with other parts of the motor circuit.

It will be understood that while in the foregoing description the resistance of the inductor coils and lockout coils has been neglected the resistance thereof is a factor to be considered in practice. Also it will be understood that the resistance of such coils may be varied to afford any desired percentage of accelerating resistance but that interchangeability of the coils will be sacrificed unless the resistance of the coils is kept within certain limits.

What I claim and desire to secure by Letters Patent is:

1. In a motor controller, in combination, a plurality of starting resistances for the motor to be excluded from circuit sequentially, a plurality of switches each controlling one of said resistance, certain of said switches each having a restraining coil connected to the resistance preceding the resistance controlled thereby, whereby operation of each switch is dependent upon prior operation of its preceding switch and means to supply a transient current to the restraining coil of each switch to delay operation thereof, said means comprising a plurality of windings arranged in a mutually inductive relation and each connected in series with the restraining coil of one of said switches.

2. In a motor controller, in combination, a plurality of resistances for inclusion in series with the motor, and a plurality of switches to be operated sequentially to short-circuit said resistances progressively, said switches having shunt operating windings and each except the first having a restraining winding paralleling the resistance to be short-circuited by the next preceding switch, and a coil connected in series with the restraining coil of each of certain of said switches, said coils being arranged in a mutually inductive relation.

3. The combination with an electric motor having a resistor associated therewith, of a plurality of switches for controlling said resistor, each of said switches having a restraining coil associated therewith and an inductor having a plurality of windings each permanently connected across different points of said resistor, each of said windings being connected in series with the restraining coil of one of said switches and being adapted to supply a transient current to its associated restraining coil upon exclusion of a given portion of said resistor from the motor circuit.

4. In a motor controller, in combination, resistance varying means and electroresponsive means to effect arrest of the action of the former means in different stages thereof, said electroresponsive means including an inductive device having a plurality of coils arranged in a mutually inductive relation and normally connected in series with the motor armature and in parallel with different parts of the motor circuit to render said means responsive to a varying current with an inherently transient effect.

5. In a motor controller, in combination, accelerating means and means having an inherently transient effect to arrest the accelerating operation of the former means in different stages thereof subject to control by the electrical condition of the motor circuit, the second mentioned means including a plurality of windings arranged in a mutually inductive relation and each connected in shunt across different parts of the motor circuit.

6. In a motor controller the combination with accelerating switches to be operated in sequence, said switches having individual restraining coils, of windings arranged in a mutually inductive relation to supply transient currents to the restraining coils of different switches, and commutatable connections for said windings providing for inclusion of all of said windings in the motor circuit upon completion of the latter and for progressive exclusion of said windings from the motor circuit upon sequential closure of said accelerating switches.

7. In a motor controller, in combination, accelerating means and means to arrest for temporary periods the accelerating action of the former means in different stages thereof, the latter means including windings arranged in a mutually inductive relation and connected in shunt across different parts of the motor circuit, and commutatable connections therefor to cause each winding to act by induction in successive stages of acceleration to arrest the accelerating operation.

8. The combination with an electric motor having a resistor associated therewith, of a plurality of switches for controlling said resistor, each of said switches having a restraining coil associated therewith which is connected across a portion of said resistor and an inductive winding connected in series with the restraining coil of each of said switches, said inductive windings being arranged in a mutually inductive relation, and certain of said windings being arranged so that the magnetomotive force thereof opposes the magnetomotive force of other of said windings.

9. The combination with an electric motor having a resistor associated therewith, of a plurality of electroresponsive switches for controlling said resistor, each of said switches having a restraining winding associated therewith which is connected in shunt with a portion of said resistor and an inductor having a plurality of like coils arranged in a mutually inductive relation and each connected in series with the restraining winding of one of said switches.

10. In a motor controller, in combination, accelerating means and means to arrest for temporary periods the accelerating action of the former means in different stages thereof, the latter means including an inductor having a core member and a plurality of windings mounted thereon, said windings being connected in shunt across different parts of the motor circuit, and being arranged so that the magnetomotive forces thereof effect reversal of the flux in said core member in each stage of acceleration.

11. In a motor controller, in combination, accelerating means and means to arrest for temporary periods the accelerating action of the former means in different stages thereof, the latter means including an inductor having a core member and a plurality of windings mounted on said core member and connected in shunt across different parts of the motor circuit, said windings being arranged so that the magnetomotive forces of certain of the same oppose the magnetomotive forces of others, and commutatable connections for said windings to cause each of the same to act in successive stages of acceleration to arrest the accelerating operation.

12. The combination with a circuit including a resistor, of means for excluding said resistor from said circuit and electroresponsive means to effect arrest of the action of the former means in different stages thereof, said electroresponsive means including an inductive device having a plurality of coils arranged in a mutually inductive relation and permanently connected in shunt across different parts of said resistor to render said electroresponsive means responsive to varying current with an inherently transient effect.

13. The combination with a motor and a supply circuit therefor, of means for establishing reverse power connections for the motor from said supply circuit, a plurality of accelerating switches operable sequentially, said switches having individual restraining coils and an inductor for supplying said restraining coils with inherently transient currents to delay operation of said switches, said inductor including a plurality of windings each connected across different points of the motor circuit, the inductor coil associated with the first accelerating switch providing for differentiation of the delay in closure of said switch upon starting of the motor from rest and upon plugging thereof.

14. The combination with an electric motor, of at least three accelerating units therefor affording starting resistances for the motor, said units each including an electroresponsive switch operative to accelerate the motor and restraining means for said switch comprising an inductor coil, the inductor coils of said units being normally in series with said motor and being arranged in a mutually inductive relation.

15. The combination with an electric motor, of accelerating units therefor affording starting resistances for the motor, said units each including an electroresponsive switch operative to accelerate the motor and restraining means for such switch comprising an inductor coil, the inductor coils of said units being in series with one another and with said motor and being arranged in a mutually inductive relation.

16. The combination with an electric motor, of accelerating units therefor affording starting resistances for the motor, said units each including an electroresponsive switch operative to accelerate the motor, and restraining means for such switch comprising a restraining winding and an inductor winding, the inductor windings of said units being in series with one another and with said motor and being arranged in a mutually inductive relation, and the restraining windings of said units being respectively subjected to influence by different inductor windings.

17. The combination with an electric motor, of a plurality of electroresponsive switches, each having a restraining winding associated therewith, means including inductor windings providing a plurality of steps of starting resistance for said motor, said inductor windings being arranged in a mutually inductive relation and being in series with one another and with said restraining windings.

18. The combination with an electric motor, of a starting resistance therefor, a plurality of switches for excluding said resistance in steps, each of said switches having a restraining coil associated therewith, and an inductor having a plurality of windings, said inductor windings and said restraining windings being connected in series in the motor circuit, and each of said inductor windings and one of said restraining windings being series connected and connected in shunt across given points in the motor circuit.

In witness whereof, I have hereunto subscribed my name.

FRANK J. RUSSELL.